Jan. 14, 1969  C. W. BERGHOUT ET AL  3,421,207
METHOD OF MANUFACTURING SOLID BODIES CONTAINING $Nb_3Sn$
Original Filed Sept. 22, 1964

INVENTORS
CORNELIS W. BERGHOUT
PIETER HOKKELING &
BY ANTHONIE I. LUTEIJN

AGENT 3,421,207
METHOD OF MANUFACTURING SOLID BODIES CONTAINING Nb₃Sn
Cornelis Willem Berghout, Pieter Hokkeling, and Anthonie Izaak Luteijn, Emmasingel, Eindhoven, Netherlands, assignors to North American Philips, Inc., New York, N.Y., a corporation of Delaware
Continuation of application Ser. No. 398,258, Sept. 22, 1964. This application Nov. 16, 1967, Ser. No. 683,735
Claims priority, application Netherlands, Sept. 24, 1963, 298,338
U.S. Cl. 29—599            4 Claims
Int. Cl. H01s *4/00*

ABSTRACT OF THE DISCLOSURE

A method of manufacturing bodies of Nb₃Sn in which a porous foil of niobium is assembled with a foil of a high resistively metal, the assembly is rolled up to yield a total pore volume of between 20% and 45% and is impregnated with molten tin and allowed to cool to permit the tin to solidify in the pores. Thereafter, this composite body, which is mechanically workable, is deformed into a body of desired shape and heated to convert the same into a body of Nb₃Sn.

---

This application is a continuation of Ser. No. 398,258, filed Sept. 22, 1964, now abandoned.

This invention relates to a method of manufacturing bodies containing Nb₃Sn.

Certain so-called "hard" supraconductive compounds have an infinitely low resistance for up to very high magnetic field strength at temperatures of approximately 10° K. or lower. Coils made from wire or ribbon of such hard supraconductors fundamentally afford the possibility of generating and maintaining such high field strength (100 or even 200 kilo-oersteds) with a comparatively low comparatively low consumption of energy. A material which is very attractive in this respect is the compound Nb₃Sn which permits magnetic field strengths up to 200 kilo-oersteds to be obtained. However, this compound has the disadvantage of being extremely brittle.

Bodies which consist substantially of Nb₃Sn can no longer be mechanically deformed and even no longer be mechanically worked. If a coil is to be manufactured from Nb₃Sn wire, and Nb tube is filled with a pulverulent mixture of niobium and from 15 to 35 at. percent of tin which is drawn to form wire of the diameter desired. This wire is wound to form a coil and only then subjected to a very specific thermal treatment between 920° C. and 1100° C., preferably at approximately 1,000° C., in order to obtain the Nb₃Sn compound. The limits in temperature and duration between which the thermal treatment has to take place are critical in view of the structure required for optimum supra-conductive properties.

For several uses in the field of supraconductivity and high magnetic fields there is a need for solid bodies of niobiumtin (Nb₃Sn). Such uses relates, for example, to field screening, field homogenisation and flux concentration. A solid Nb₃Sn body intended for this use generally has a complicated shape and must often satisfy accurate tolerance requirements. A known method of manufacturing such as body in which a body molded from a mixture of the pulverulent elements is mechanically worked and then subjected to the thermal treatment required for the formation of the compound does not result in a body having optimum properties. Bodies thus obtained have a density of only 80% of the X-ray density. Although the density may be increased by heating to a higher temperature, it is still impossible to improve the supraconductive properties since, as previously mentioned above, the structure of the material then becomes such that the optimum properties are not obtained.

The present invention relates to a simple and elegant method of manufacturing a body consisting substantially of Nb₃Sn which has a much higher density and hence a higher strength and a higher current-conducting capacity in the supraconducting state.

In accordance with the invention a body comprising a combination of the elements is obtained by either compressing niobium powder in a mold or winding up niobium foil at a pressure such, or with a tangential tensile force such, that the volume of the pores after molding or subsequent sintering, or the space between the foils, is from 20% to 45% and that the resulting molded, sintered or wound body is held in contact with molten tin at a temperature between 600° C. and 1,100° C. until the pores are filled with tin.

A surprising fact is that the molten tin exhibits so great a peneration into the pores of the niobium body that microscopically homogeneous bodies of many centimeters thick may be obtained in this manner. In fact, it is usually impossible to make impregnated alloys of metals which react with one another.

Since the filling of the pores is impeded by the presence of gases, it is desirable that the niobium body, before being brought into contact with tin, is heated for a short time at the temperature of the bath of molten tin or at a higher temperature in vacuo.

A small amount of Nb₃Sn is already formed as the pores are filled. A small amount may also be present of the other, likewise brittle niobium-tin compounds which are formed below 920° C. The said compounds ensure, together with the tin, the satisfactory adhesion between the niobium grains or foils. Although the impregnated alloy is brittle because of this structure, it has still been found to be excellently workable with the aid of a cutting tool. After the body has thus been given the shape desired, it is subjected to the known thermal treatment at approximately 1,000° C. during which process the reaction between niobium and tin proceeds further.

When using powder, the molded niobium body may be sintered, prior to impregnation, between 1,500° C. and 2,000° C. as is frequently done in the manufacture of impregnated alloys. It is necessary to ensure that the ultimate volume of the pores lines between 20% and 45%. However, such a sintering process is not required.

The grain size of the niobium must not be unduly small. If the grain size is less than approximately 20 microns, difficulties in the mechanical working arise after formation of the impregnated alloy at approximately 1,000° C. If the impregnated alloy is formed at a lower temperature, it can usually be worked better and powder having a smaller size of grain may be used.

Another advantage of the invention method which has not yet been mentioned is connected with the fact that, in contrast with the known method, it is not necessary to use powdery tin. The contamination with oxide is thus considerably smaller which is highly beneficial to the specific current-conducting capacity of the final product. The body obtained has a high density between 90% and 95% with respect to the X-ray density of Nb₃Sn, which is 8.92.

According to a further embodiment of the method according the invention, a coil-shaped body is manufactured which consists substantially of insulating Nb₃Sn. In this method, one or more niobium foils are rolled up together with foil of a metal which has a high resistivity at the temperature of liquid helium and which does not interferingly react with tin.

In this construction it is very important that interferring reaction of the tin with the resistance material does not occur. Several solutions therefore are possible. Firstly it is possible to use alloys on the basis of chromium, molybdenum and tungsten which react with tin only at a very low rate, for example, an alloy of molybdenum and 20% by weight of tungsten.

It is also possible that the resistance material chosen is an alloy on which an oxide film can be formed which is mechanically strong and chemically stable so as to prevent any reaction with tin. Examples thereof are Ni-Cr and Fe-Ni-Al alloys.

The most attractive solution to the problem is the use of a foil packet Nb/resistance material/Nb. If such a packet has been rolled so that rigid adhesion exists between the niobium and the resistance material, it is impossible for tin to penetrate during impregnation.

Coils manufactured in accordance with this further embodiment of the invention have specific, very favorable properties. They are of a very rigid construction which is very advantageous in view of the brittleness of $Nb_3Sn$. The ratio of the amount of current conducting material to the total amount of material is very favorable and is from 50% to 75%. It is very simple structurally to form the current-conducting channel with a diameter which decreases from the interior to the exterior. To this end, a plurality of foils of equal width but of different length are wound together with a foil of the resistance material having a length equal to that of the longest niobium foil. The reason of such a construction is connected with the dependency of the current-conducting capacity of a supraconductor upon the magnetic field strength. The result of this construction is an important saving of material and space.

The invention will now be explained in detail with reference to several examples and the accompanying drawing in which, FIG. 1 is a longitudinal sectional view of a flux concentrator of $Nb_3Sn$;

*Example 1*

Figure 1:
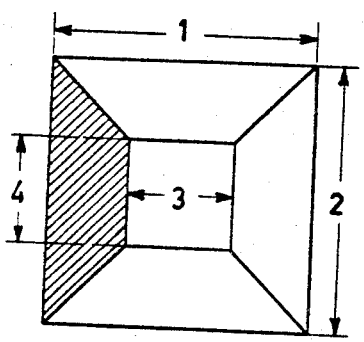
Figure 2:
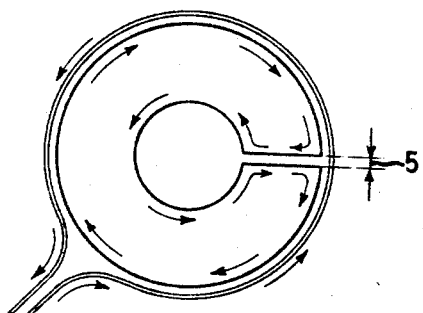
FIG. 2 is a plan view of the concentrator.

A coil as shown in FIGS. 1 and 2 was manufactured by first molding powdery niobium having a grain size between 30 microns and 40 microns at a pressure of 1,000 kgs./sq.cm. into a cylindrical shape. The resulting body is subsequently heated for a short time in vacuo at a temperature of 1,000° C., in order to remove occluded gases. Then the body, without having been in contact with air, was submerged in a bath of molten tin having a temperature of 1,000° C. and held in it for 30 seconds. Subsequently, the body was cooled and shaped into the form shown in FIGURES 1 and 2 with the aid of a cutting tool. The outer cylinder had a diameter 1 of 25 mms. and a height 2 of 25 mms. the inner cylinder had a diameter 3 of 10 mms. and a height 4 of 10 mms., and the gap width 5 was 0.5 mm. (FIGURE 2). Lastly, the resulting body was heated at 1,000° C. for 16 hours. The concentration ratio in a magnetic field which was constant in time has been found to be 2.3 in the supraconductive state.

*Example 2*

Five strips of niobium foil each 8 mms. wide and 20 microns thick were wound, together with a strip consisting of an alloy of molybdenum with 20% by weight of tungsten and likewise 8 mms. wide and 40 microns thick, on a niobium tube, provided with a saw-cut having an internal diameter of 3 mms. and an external diameter of 4 mms. the winding being effected up to a total diameter of 20 mms. The number of windings was 44. The resulting body was held in vacuo submerged in a bath of molten tin having a temperature of 1,000° C. for 30 seconds. Then the body was heated in a sealed quartz tube under the vapor tension of tin at 1,000° C. for 4 hours. After cooling, the resulting coil was cut to discs of 1.5 mms. thick. When placed in liquid helium and supplying a current of 100 amps. a magnetic field of 5000 oersteds occurred at the center of the coil within 30 seconds.

Figure 3:
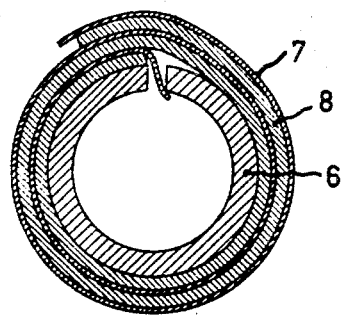
FIG. 3 is a cross-sectional view of another embodiment.

FIGURE 3 is a cross-sectional view of the resulting coil. It shows the tubular niobium core 6 and several of the coil windings comprising a coil 7 of molybdenum and 20% by weight of tungsten and a coil 8 of $Nb_3Sn$, wound together with it.

*Example 3*

Foil was wound on four molybdenum cylinders each having an internal diameter of 7 mms., an external diameter of 10 mms. and a length of 9 mms., which were provided at their periphery with 12 grooves extending parallel to the axis of the cylinder and having a width of 1.2 mms. and a depth of 1.2 mms., the winding being effected up to a diameter of 26 mms. The total number of windings was from 50 to 60. From 15 to 17 windings consisted of 5 layers of niobium foil each 20 microns thick and one layer of foil consisting of molybdenum and 20% by weight of tungsten and 40 microns thick, also from 15 to 17 windings consisted of 4 layers of niobium foil and one layer of molybdenum-tungsten, and the remaining number of windings consisted of 3 layers of niobium foil and one layer of molybdenum-tungsten. The whole was surrounded by a cylindrical ring having a length of 9 mms., an internal diameter adjoining the foil winding of 26 mms. and an external diameter of 32 mms.

The resulting body was held submerged in liquid tin at a temperature of 970° C. for 2 minutes and then heated at a temperature of 970° C. under the equilibrium vapor pressure of tin for 6 hours.

Next each body was cut to 9 discs of 1 to 2 mms. thick. Said discs were combined to form a coil so as to be connected in series with regard to current but with their magnetic fields equally directed. That is to say that the discs were stacked on one another while being alternately turned over. The disc were through-connected with the aid of copper pins of 1 mm. in diameter.

The resulting coil was placed in a cryostat containing liquid helium and energized with a current of 100 amps. A magnetic field of 10,000 oersteds was obtained after 5 minutes and one of 18,000 oersteds after 30 minutes. Thereafter the field no longer varied. There were no indications that the current of 100 amps. is the maximum under these conditions.

What is claimed is:

1. A method of manufacturing a coil-shaped body consisting substantially of insulating $Nb_3Sn$ comprising the steps of rolling a foil of porous Nb together with a foil of a metal having a high resistivity at the temperature of liquid helium and which does not interfere in a reaction between tin and niobium to form a body in which a foil of said metal is between foils of niobium and said body has a pore volume of about 20% to 45%, impregnating said body with molten tin at a temperature between 600° C. and 1100° C. for a time sufficient to fill the pores thereof with tin while forming only a small amount of $Nb_3Sn$, cooling said body to solidify the tin in the pores thereby forming a composite, mechanically deformable body of niobium, tin and said metal of high resistivity, mechanically deforming said composite body into a desired shape, and thereafter heating said body to convert the niobium and tin into the compound $Nb_3Sn$.

2. A method as claimed in claim 1 in which the metal intermediate two foils of niobium is an alloy of chromium, molybdenum and tungsten.

3. A method as claimed in claim 1 in which the metal intermediate two niobium foils is an alloy of molybdenum and 20% by weight of tungsten.

4. A method as claimed in claim 1 in which the metal intermediate the niobium foils is an alloy of nickel and chromium.

(References on following page)

References Cited

UNITED STATES PATENTS

| | | | |
|---|---|---|---|
| 3,084,041 | 4/1963 | Zegler et al. | |
| 3,181,936 | 5/1965 | Denny | 29—194 |
| 3,206,183 | 9/1965 | Garwick | 266—34 |
| 3,218,693 | 11/1965 | Allen et al. | 29—599 |
| 3,258,828 | 7/1966 | Swartz | 29—599 |
| 3,273,092 | 9/1966 | Hnilicka | 29—599 |

OTHER REFERENCES

Superconductivity of $Nb_3Sn$ by Matthias et al., Phys. Rev. vol. 95, No. 6, Sept. 15, 1954 (p. 1435).

JOHN F. CAMPBELL, *Primary Examiner.*

PAUL M. COHEN, *Assistant Examiner.*

U.S. Cl. X.R.

29—194